US008651693B2

(12) United States Patent
Josefowicz et al.

(10) Patent No.: US 8,651,693 B2
(45) Date of Patent: Feb. 18, 2014

(54) LIGHT EMITTING DIODE ROADWAY LIGHTING OPTICS

(75) Inventors: Jack Yitzhak Josefowicz, Halibut Bay (CA); John Adam Christopher Roy, Chester Basin (CA); Adam Frederick Chaffey, Timberlea (CA)

(73) Assignee: LED Roadway Lighting Ltd. (CA)

( * ) Notice: Subject to any disclaimer, the term of this patent is extended or adjusted under 35 U.S.C. 154(b) by 230 days.

(21) Appl. No.: 13/063,831

(22) PCT Filed: Sep. 15, 2009

(86) PCT No.: PCT/CA2009/001279
§ 371 (c)(1),
(2), (4) Date: Apr. 22, 2011

(87) PCT Pub. No.: WO2010/028505
PCT Pub. Date: Mar. 18, 2010

(65) Prior Publication Data

US 2011/0194281 A1 Aug. 11, 2011

Related U.S. Application Data

(60) Provisional application No. 61/097,211, filed on Sep. 15, 2008, provisional application No. 61/097,216, filed on Sep. 15, 2008, provisional application No. 61/238,348, filed on Aug. 31, 2009.

(51) Int. Cl.
*F21V 1/00* (2006.01)
*F21V 11/00* (2006.01)
*B60Q 1/26* (2006.01)

(52) U.S. Cl.
USPC ........... 362/235; 362/227; 362/236; 362/237; 362/238; 362/157

(58) Field of Classification Search
None
See application file for complete search history.

(56) References Cited

U.S. PATENT DOCUMENTS 6,250,774 B1 6/2001 Begemann et al.
6,543,911 B1 4/2003 Rizkin et al.
6,739,738 B1 5/2004 Smith
6,816,389 B1 11/2004 Lutz et al.
6,902,291 B2 6/2005 Rizkin et al.
7,278,761 B2 10/2007 Kuan (Continued)

FOREIGN PATENT DOCUMENTS

CN 1811266 A 8/2006
CN 101101098 A 1/2008

(Continued)

OTHER PUBLICATIONS

English machine translation of Zhang (CN 201187734).*

(Continued)

*Primary Examiner* — Natalie Walford
(74) *Attorney, Agent, or Firm* — Stevens & Showalter LLP

(57) ABSTRACT

An optical module for an lighting fixture for providing roadway illumination. The optical module comprising circuit board having a plurality of light emitting diodes (LEDs). A reflector cups surrounds each of the plurality of LEDs, the cup comprises a narrow end surrounding the LED and a larger opening at a second end opposite the LED. A refractor lens cover comprising a plurality of molded lens, each lens positioned at the second end of the reflector cups.

23 Claims, 27 Drawing Sheets

(56) References Cited

U.S. PATENT DOCUMENTS

| | | | | |
|---|---|---|---|---|
| 7,641,363 | B1 | 1/2010 | Chang et al. | |
| 7,651,245 | B2 | 1/2010 | Thomas et al. | |
| 7,665,862 | B2 | 2/2010 | Villard | |
| 7,766,508 | B2 | 8/2010 | Villard et al. | |
| 7,771,087 | B2 | 8/2010 | Wilcox et al. | |
| 7,810,963 | B2 | 10/2010 | Peck | |
| 7,832,898 | B2 | 11/2010 | Li | |
| 7,922,372 | B2 | 4/2011 | Li | |
| 7,959,331 | B2 | 6/2011 | Ho | |
| 7,993,039 | B2 | 8/2011 | Nankil et al. | |
| 8,113,687 | B2 | 2/2012 | Villard et al. | |
| 8,220,961 | B2 | 7/2012 | Belknap et al. | |
| 8,267,544 | B2 | 9/2012 | Zheng et al. | |
| D673,720 | S * | 1/2013 | Bailey et al. | D26/138 |
| D674,950 | S * | 1/2013 | Lueken et al. | D26/71 |
| D674,964 | S * | 1/2013 | Bailey et al. | D26/118 |
| 8,376,582 | B2 | 2/2013 | Catone et al. | |
| 8,408,739 | B2 | 4/2013 | Villard et al. | |
| D684,296 | S * | 6/2013 | Henderson et al. | D26/118 |
| 8,529,085 | B2 * | 9/2013 | Josefowicz et al. | 362/158 |
| 2007/0030676 | A1 | 2/2007 | Ichihara | |
| 2008/0062691 | A1 | 3/2008 | Villard et al. | |
| 2009/0034255 | A1 | 2/2009 | Li | |
| 2011/0210676 | A1 | 9/2011 | Beghelli | |
| 2012/0025711 | A1 | 2/2012 | Best et al. | |

FOREIGN PATENT DOCUMENTS

| | | | |
|---|---|---|---|
| CN | 101105278 | A | 1/2008 |
| CN | 101230962 | A | 7/2008 |
| CN | 201187734 | Y | 1/2009 |
| EP | 1400747 | A2 | 3/2004 |
| EP | 1988576 | A1 | 3/2008 |
| EP | 1956290 | A1 | 8/2008 |
| EP | 2020564 | A1 | 2/2009 |
| GB | 2439745 | A | 7/2006 |
| JP | 2004303614 | A | 10/2004 |
| WO | 9833007 | | 7/1998 |
| WO | 03048637 | A1 | 6/2003 |
| WO | 2006060905 | A1 | 6/2006 |
| WO | 2009104067 | A1 | 8/2009 |

OTHER PUBLICATIONS

Athina Nickitas-Etienne; International Preliminary Report on Patentability; International Application No. PCT/CA2009/001283; Mar. 24, 2011; International Bureau of WIPO; Geneva Switzerland.

Athina Nickitas-Etienne; International Preliminary Report on Patentability; International Application No. PCT/CA2009/001279; Mar. 24, 2011; International Bureau of WIPO; Geneva Switzerland.

Office Action; Chinese Application No. 200980145528.5; Aug. 24, 2012; State Intellectual Property Office of P.R.C.

Amerongen, Wim; Extended European Search Report for European Application No. 09812588.3 (PCT/CA2009001279); May 30, 2012.

Amerongen, Wim; Extended European Search Report for European Application No. 09812592.5 (PCT/CA2009001283); May 22, 2012.

Alan Jones; International Search Report for International application No. PCT/CA2009/001283; Dec. 10, 2009; Gatineau, Quebec.

Malgorzata Samborski; International Search Report for International application No. PCT/CA2009/001279; Dec. 23, 2009; Gatineau, Quebec.

U.S. Appl. No. 13/063,823, filed Mar. 14, 2011 which is the national stage entry of PCT/CA2009/001283 filed Sep. 15, 2009.

James W. Cranson Jr.; Notice of Allowance in U.S. Appl. No. 13/063,823; Apr. 16, 2013; U.S. Patent and Trademark Office; Alexandria, VA; 24 pages.

* cited by examiner

LIGHT EMITTING DIODE ROADWAY LIGHTING OPTICS

CROSS-REFERENCE TO RELATED APPLICATIONS

This application claims priority from U.S. Provisional Application No. 61/097,216 filed Sep. 15, 2008, U.S. Provisional Application No. 61/097,211 filed Sep. 15, 2008 and U.S. Provisional Application No. 61/238,348 filed on Aug. 31, 2009, the contents of which are hereby incorporated by reference.

TECHNICAL FIELD

The present invention relates to light emitting diode (LED) lighting fixtures and in particular to an LED lighting section for use in a lighting fixture for roadway illumination.

BACKGROUND

Outdoor lighting is used to illuminate roadways, parking lots, yards, sidewalks, public meeting areas, signs, work sites, and buildings commonly using high-intensity discharge lamps, often high pressure sodium lamps (HPS). The move towards improved energy efficiency has brought to the forefront light emitting diode (LED) technologies as an alternative to HPS lighting in commercial or municipal applications. LED lighting has the potential to provide improved energy efficiency and improved light output in out door applications however in a commonly used Cobra Head type light fixture the move to include LED lights has been difficult due to heat requirements and light output and pattern performance. There is therefore a need for an improved LED light fixture for outdoor applications.

SUMMARY

In accordance with the present disclosure there is provided an optical module for use in an lighting fixture for providing illumination of a plane. The optical module comprising a plurality of light emitting diodes (LEDs) mounted on a circuit board; a plurality of reflector cups, each reflector cup surrounding one of the plurality of LEDs at a narrow first end and a larger opening at a second end opposite the LED; and a lens cover comprising a plurality of molded lenses for covering the plurality of reflector cups, each of the plurality of lens of the lens cover positioned at the second end of the reflector cups providing a refractor over the opening of each reflector, wherein each of the plurality of lenses are oriented to provide illumination towards a plane in a defined lighting pattern.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-23.

The traditional Cobra Head lighting fixture has presented problems in term of heat dissipation and light output and pattern performance and have present a sub-optimal replacement for existing HPS lighting systems. To overcome these issues an improved fixture containing an improved illumination section is provided.

A combination reflector refractor design is provided to produce optimal type II distribution which meets Illuminating Engineering Society of North America (IESNA) specifications for both luminance and illuminance levels and uniformity. The distribution is also tailored to meet Commission Internationale de L'Eclairage (CIE) specifications for Luminance levels and uniformity. The illumination pattern is selected to maximize lighting efficiency and maximize pole spacing for the above standards.

Figure 1:
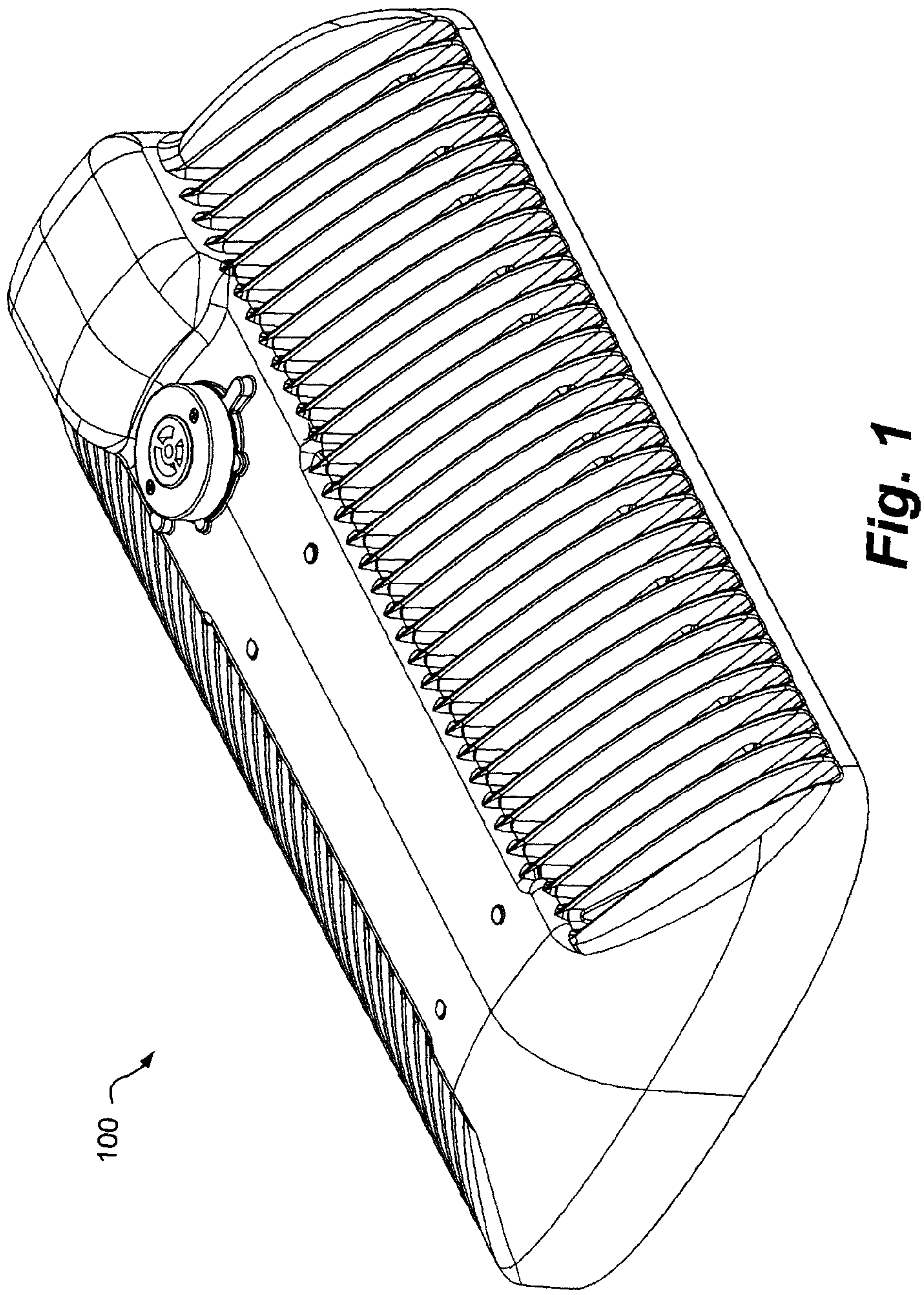
FIG. 1 shows a perspective view of a top side of a roadway lighting fixture.

As shown in FIG. 1 an improved exterior light fixture 100 for LED lights is provided. The exterior light fixture 100 is compatible with Cobra head mounts. The light fixture 100 provides the required optics and thermal performance so that the LED light fixture 100 may be used for illuminating roadways according to Type II IES light distribution requirements. The light fixture 100 design, including the angles of the LED light engines (i.e., PCB boards with the LEDs assembled on them), can meet Institute of Lighting Engineers (IES) Type II light distribution on the road. In addition to the constraints required to provide proper illumination, the design of the light fixture 100 is further dictate by the thermal model to ensure that the heat produced by the LEDs of the LED light engines is dissipated sufficiently to ensure proper operation of the LEDs.

Figure 2:
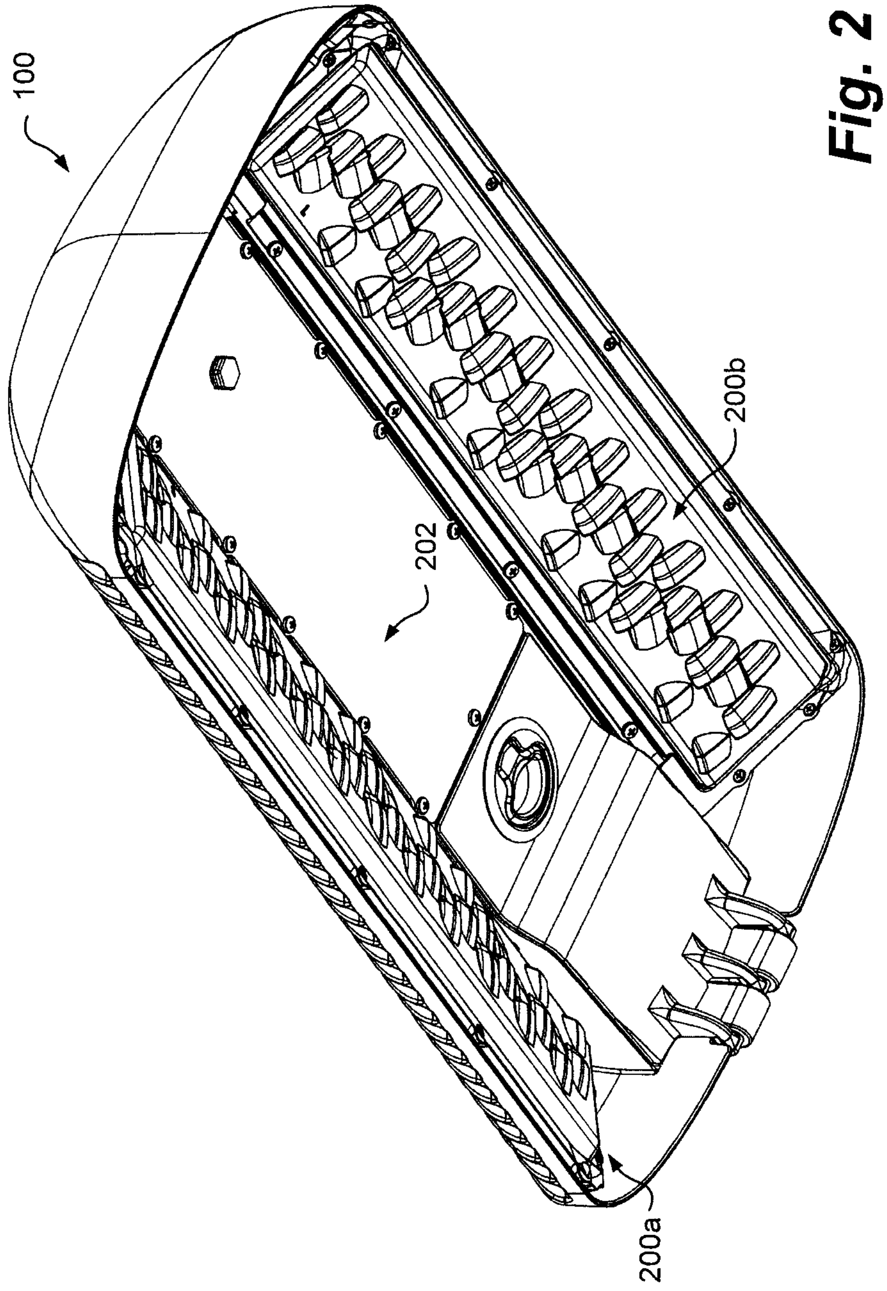
FIG. 2 shows a perspective view of an underside of a roadway lighting fixture.
Figure 3:
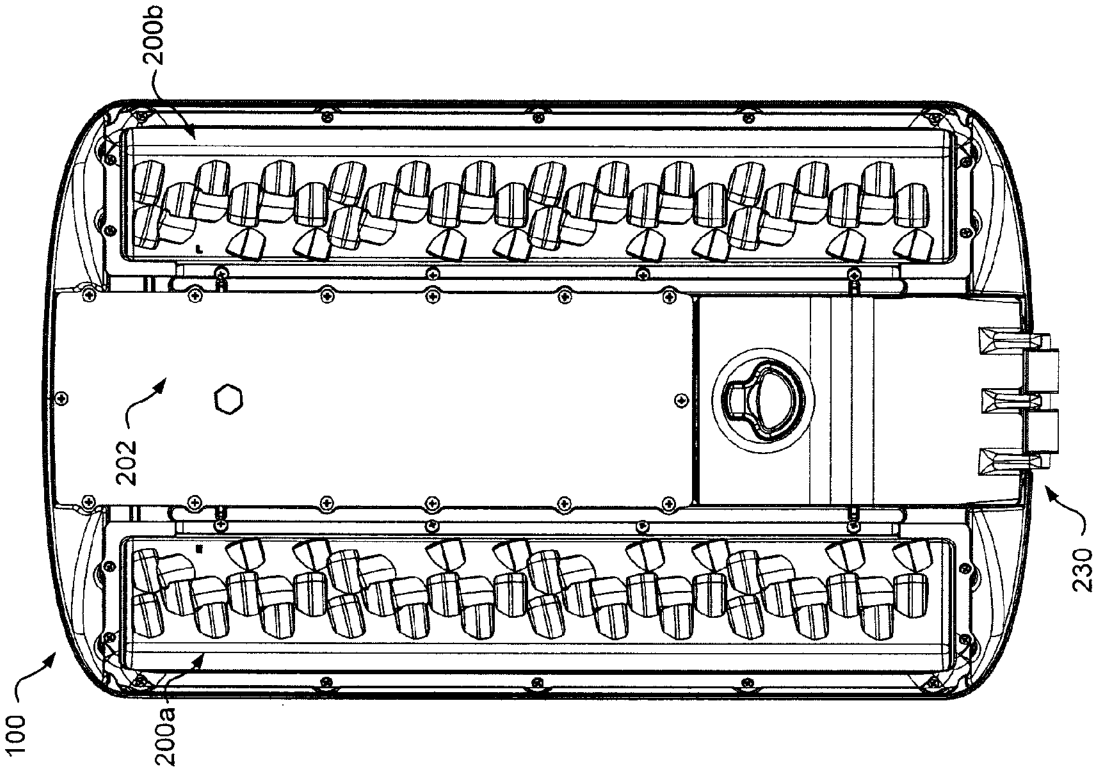
FIG. 3 shows a bottom side of a roadway lighting fixture.

As shown in FIGS. 2 and 3, the light fixture 100 has two LED engines 220*a*, 200*b*, one on either side of a center section 202 of the light fixture 100 as shown in FIG. 2. Splitting the light source into two LED sections 200*a*, 200*b* allows the heat that is given off from the LED's to be dispersed between two sections, which helps to reduce the thermal degradation to the LED's. By splitting the LED's into two sections consisting of half the amount of LED's of the whole fixture, the amount of cross heating of the LED's from the neighboring LED's is also reduced. The two sections are separated by the center section 202 of the light fixture 100. The exterior of the center section 202 has a top surface, as seen in FIG. 1, that has an arcuate cross section. The interior of the center section 202 houses the electronics, including the power supply for the LEDs. The center section 230 may include a sealable front section for enclosing the electronics. The sealable front section may be sealed by a cover plate that is fixed to the light fixture using, for example, screws. The center section 202 may further include a rear section 230 that consists of the pole mount area and electrical connection area. The rear section 112 may be covered by a hinged door.

Figure 4A:
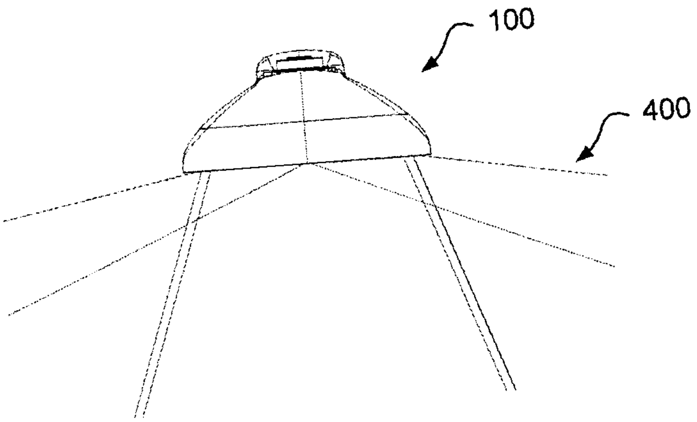
FIG. 4A-C show a representation of the lighting pattern provided by the roadway lighting fixture.
Figure 4B:
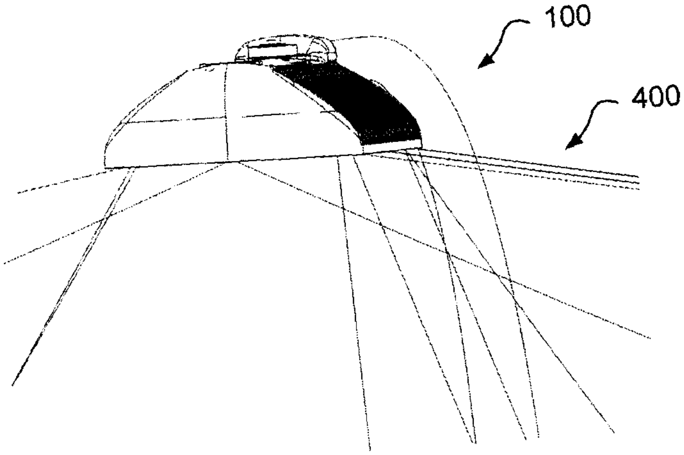
Figure 4C:
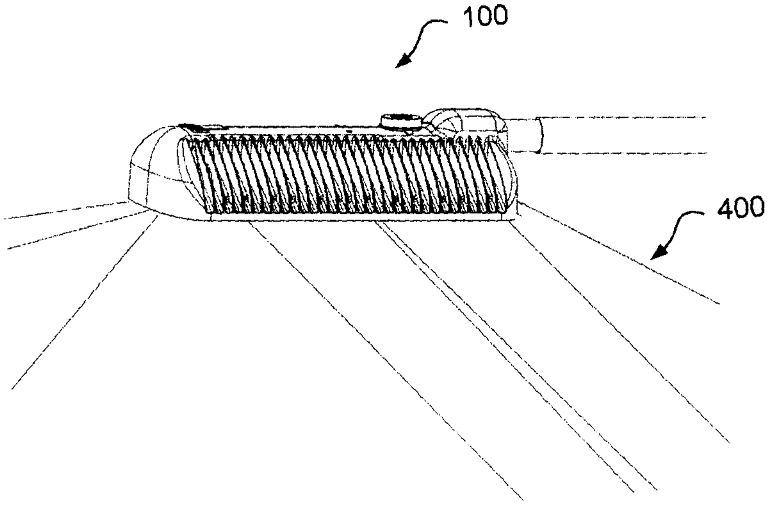

FIGS. 4A-4C show samples of the illumination pattern provided by the light fixture 100. The illumination pattern 400 is selected to maximize lighting efficiency, maximize pole spacing and generate uniform illumination. The resulting illumination distribution is defined by the Illuminating Engineering Society of North America (IES) which is an internationally recognized standards organization. The IES standard called RP-8 is used by street design engineers around the world. The RP-8 manual describes the quantitative illumination specifications for different street and roadway layouts, i.e., 2 lane roads, 3 lane, 4 lane highways, clover leafs, and all manner of different street layouts. The IES 2 lane street layout calls for an IES Type II illumination pattern as provided by the present fixture and is the most common pattern used for 2 lane streets.

Figure 5:
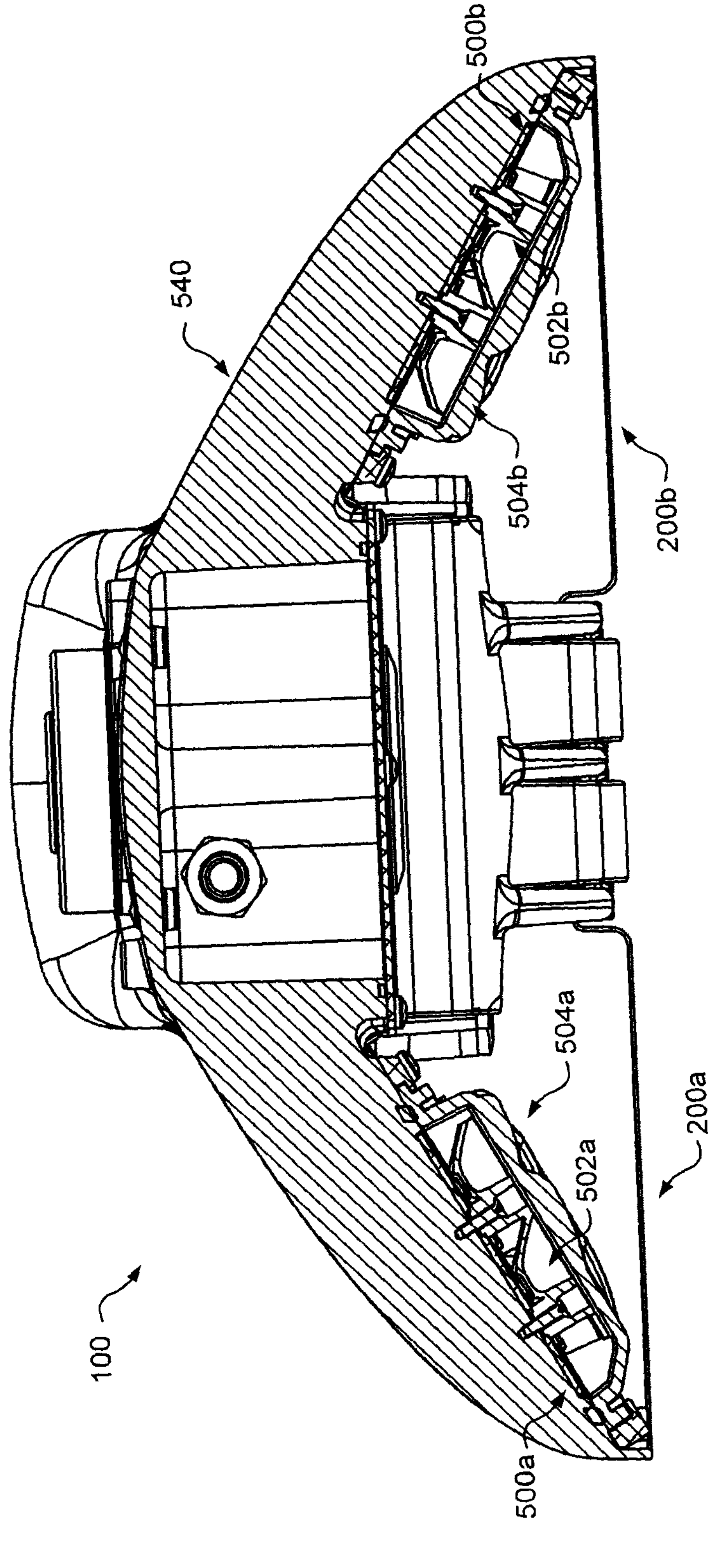
FIG. 5 shows a cross-section of a roadway lighting fixture.

FIG. 5 shows a cross-section of the roadway lighting fixture 100. Each of the LED sections 200*a*, 200*b* contain one or more optical modules comprise a LED engine board 500*a*, 500*b* mounted in the lighting fixture compartment providing multiple LEDs on a circuit board. Reflectors 502*a*, 502*b* are provided around each LED light of the engine board 500*a*, 500*b* and is covered by a reflector 504*a*, 504*b* to direct the light output in a desired pattern. Exterior fins 540 remove heat away from the LED light engine to provide cooling.

Figure 6:
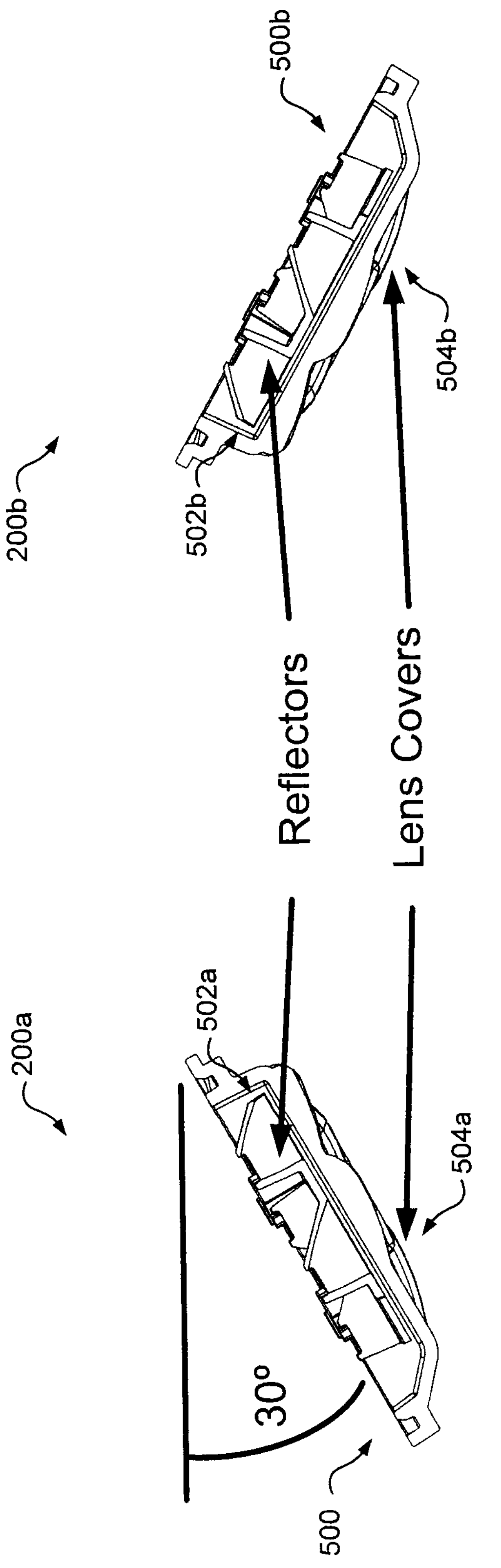
FIG. 6 show the illumination sections of a roadway lighting fixture.

As shown in FIG. 6, the optics is split into two parts illuminating different sections of the roadway 200*a*, 200*b*. The angle of the optics is 30° relative to the horizontal roadway which helps provide the throw required to achieve superior pole spacing while meeting IESNA and CIE requirements. For other customized light distribution patters, this angle can be changed in order to optimize the optics configuration.

Figure 7B:
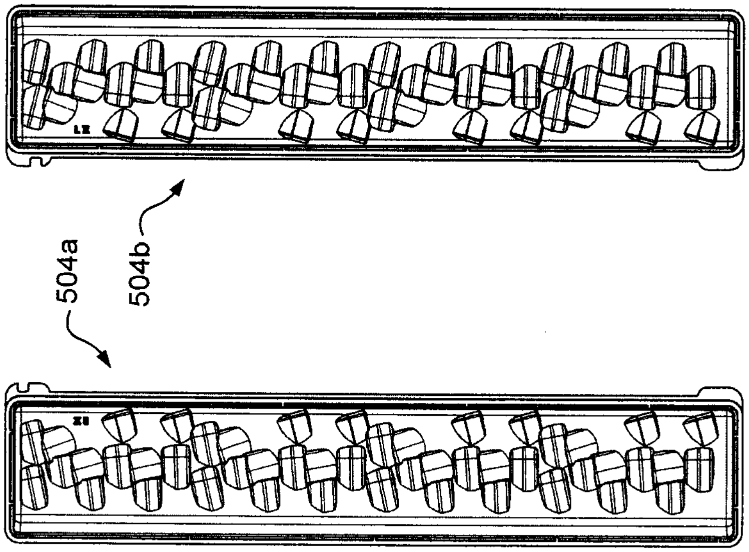
FIG. 7A-C shows views of a lens cover of a illumination section.
Figure 7A:
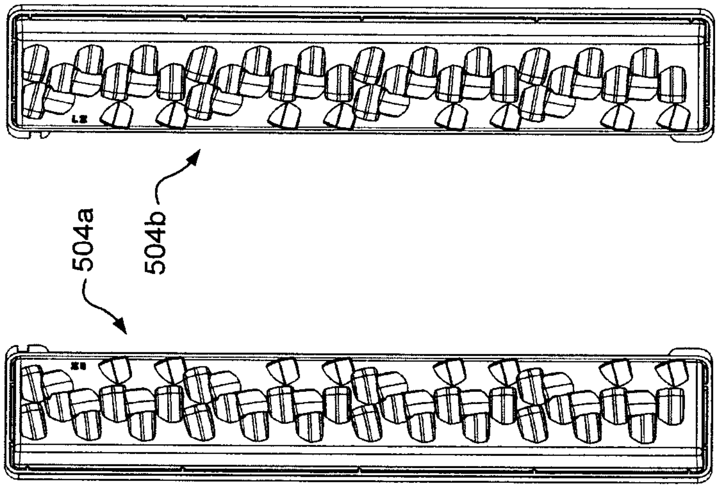
Figure 7C:
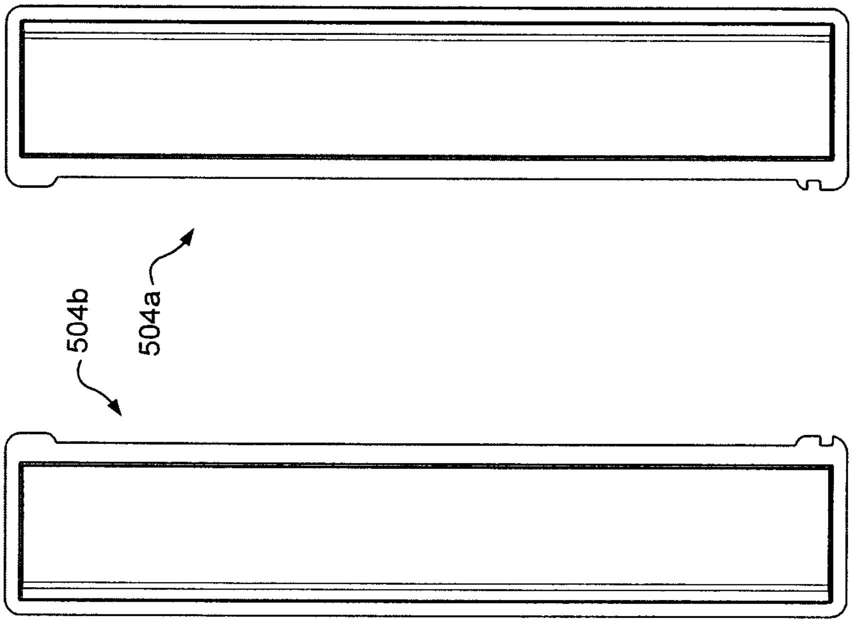

FIG. 7A-C shows views of a lens cover of a illumination section. The lens cover comprises a lens for each of the associated LED and reflector cups. The lens covers are provided in pairs, 504*a*, 504*b* providing symmetrical lighting patterns. FIG. 7A shows the lens covers 504*a*, 504*b* from below, at an angle of 30° from the illumination plane. FIG. 7B shows the lens covers 504*a*, 504*b* in a flat configuration. FIG. 7C shows the lens covers 504*b*, 504*a* from behind.

Figure 8:
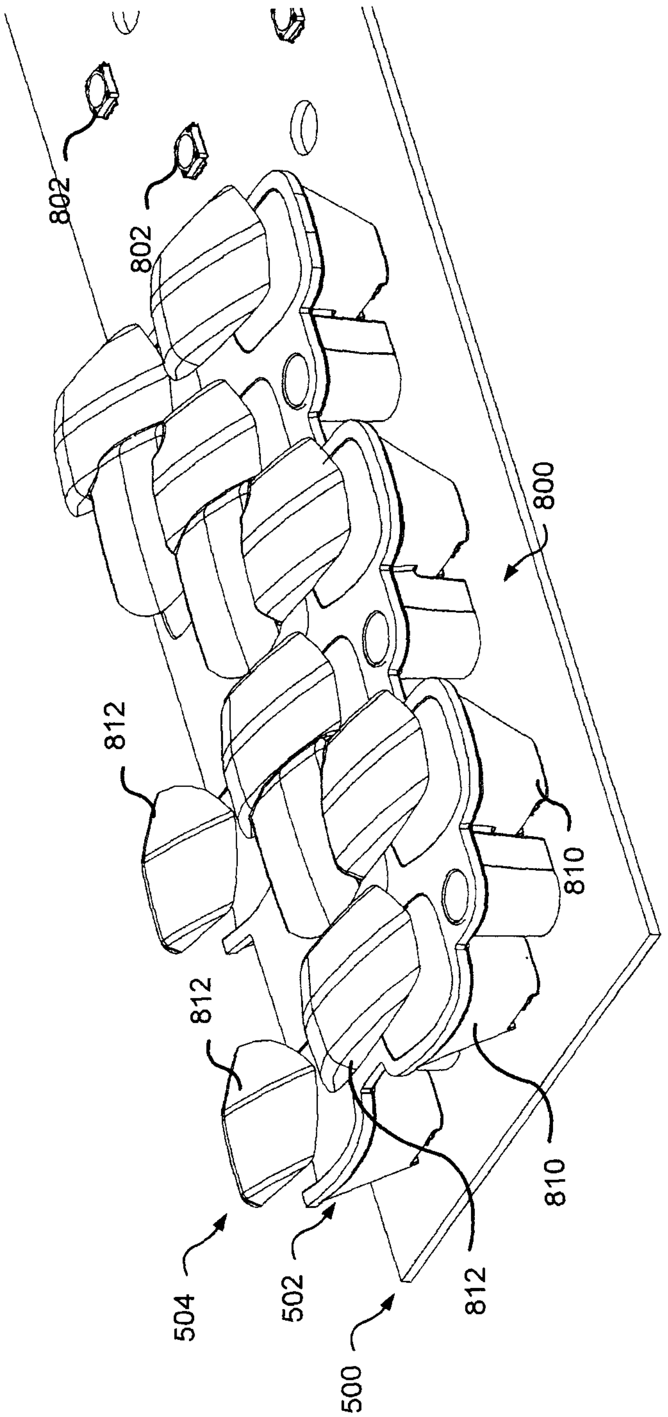
FIG. 8 shows a perspective view of an optical module.
Figure 9:
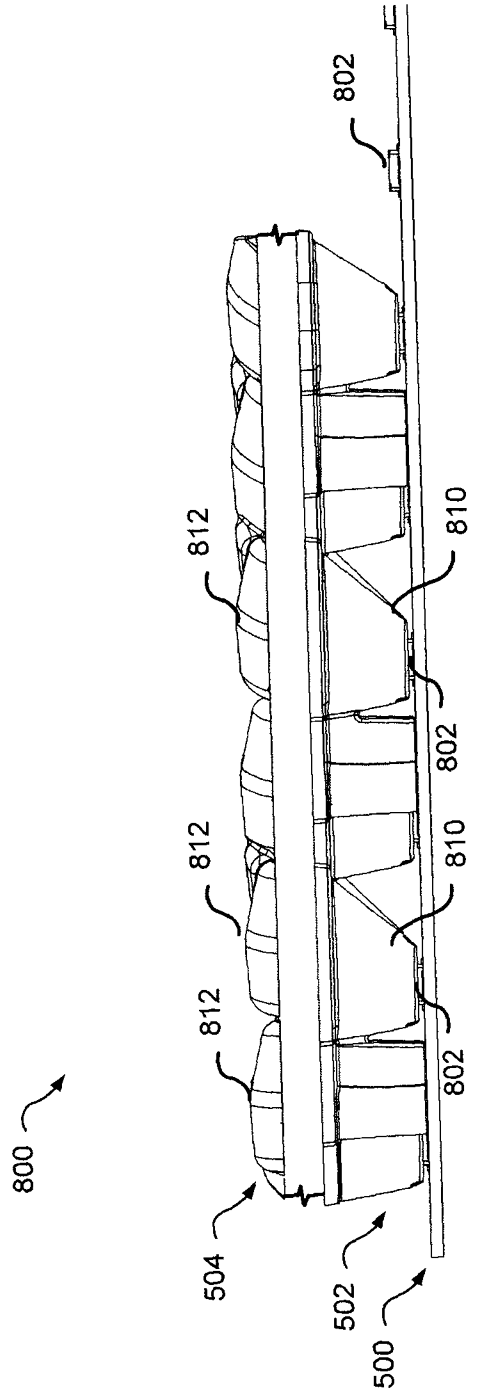
FIG. 9 shows a side view of an optical module.
Figure 10:
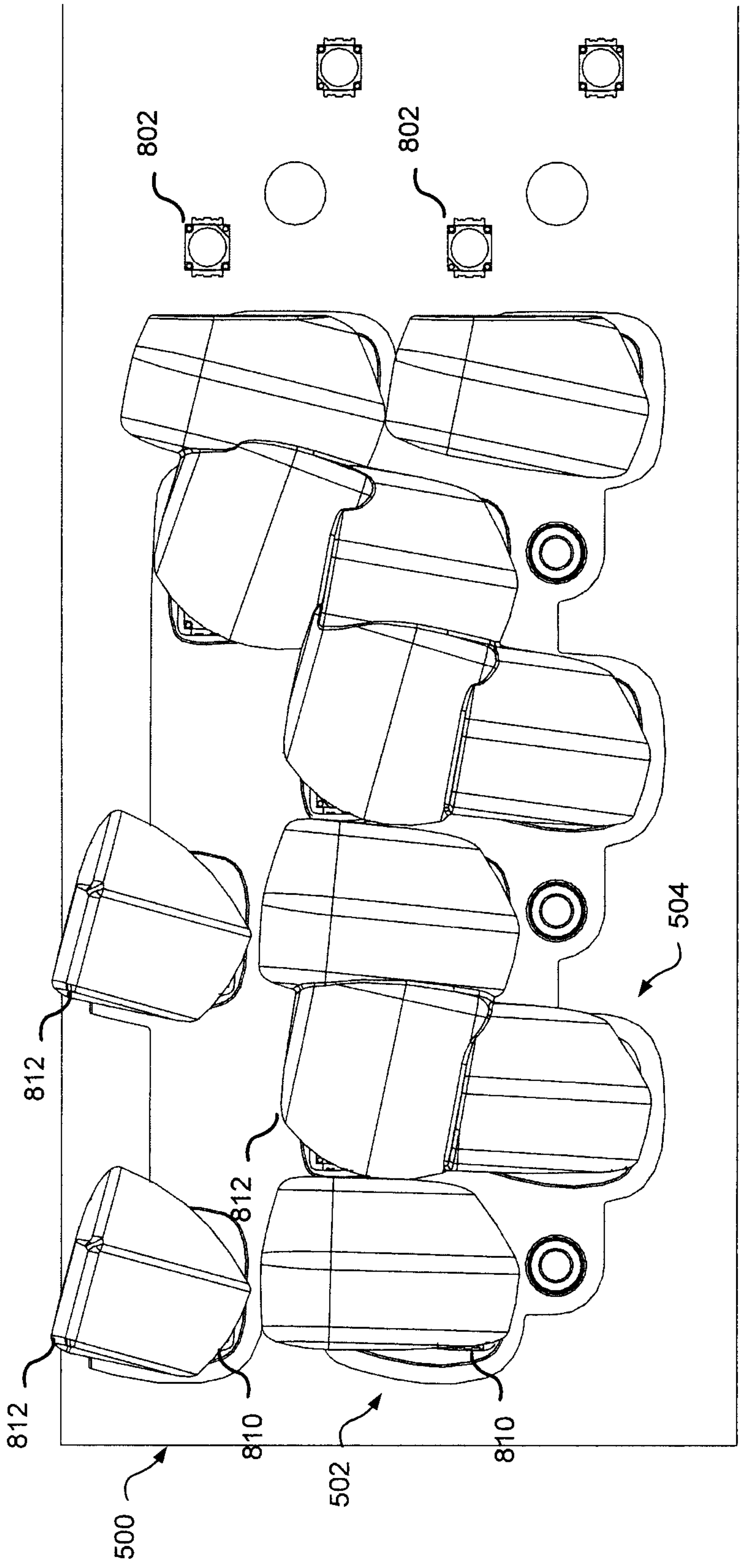
FIG. 10 shows a top view of an optical module.

FIG. 8 show a perspective view, FIG. 9 a side view and FIG. 10 a top view of the LED optical module 800 comprising a light engine 500, containing multiple LEDs 802. The reflector 502 comprises multiple reflectors or cups 810, each covering an LED. The lens cover 504 provides lenses 812 which individually cover the associated lens reflectors and are oriented to direct the light output of the associated LED. The light engine 500 circuit board (only a portion is shown) can accommodate multiple illumination sections to distinct illumination groups or may only be associated with a single illumination section. The board can be populated with LEDs 802 based upon the number of modules to be accommodated.

Figure 11:
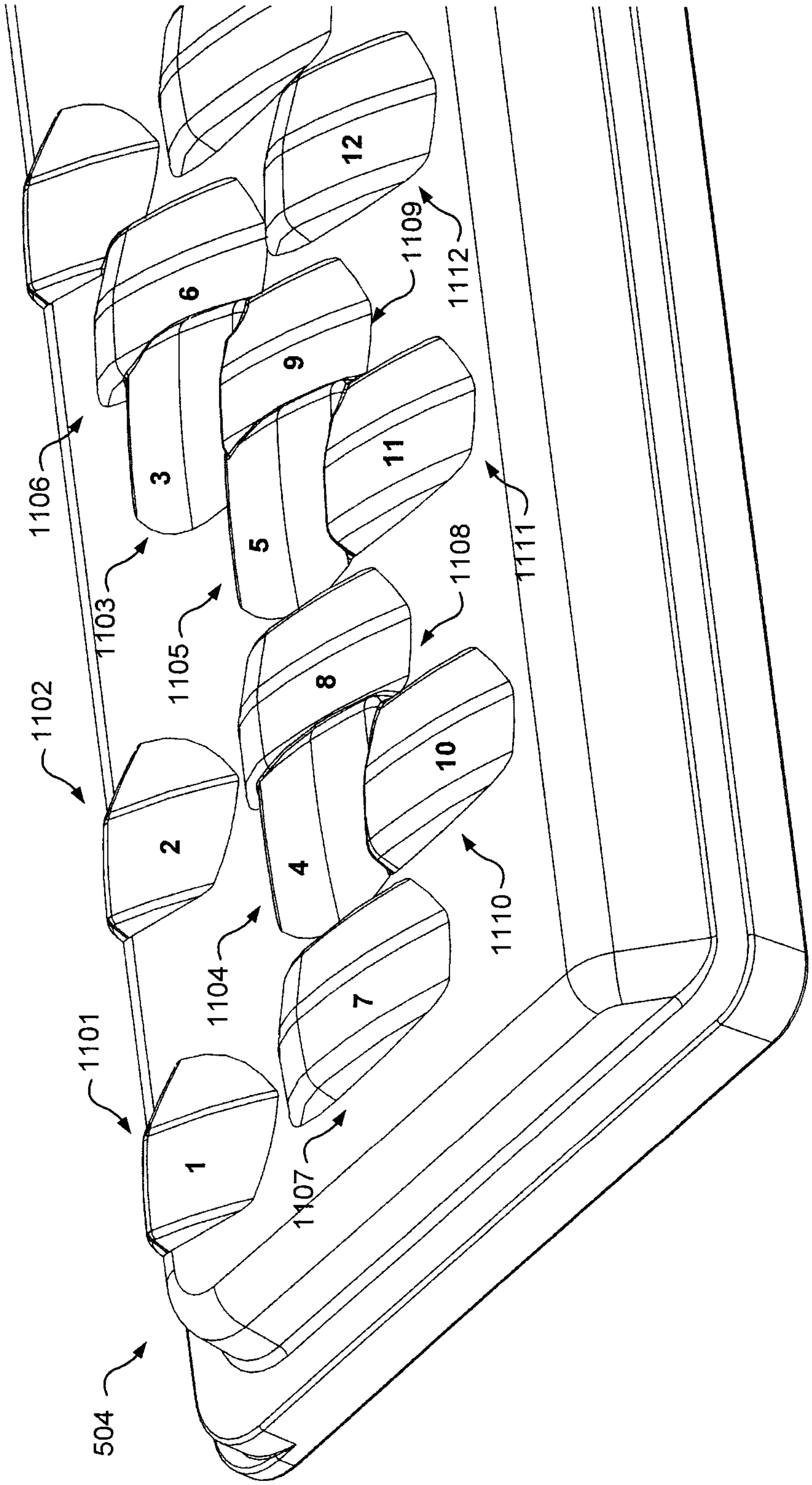
FIG. 11 shows a portion of a lens cover.

As shown in FIG. 11, each lens cover can comprise multiple blocks of lenses, each utilizing multiple unique elements to direct light to specific portions of the roadway to achieve a uniform distribution. The refractive elements are incorporated into an acrylic cover lens. Specifically, the lenses are molded into the large lens cover so that the individual refractor lenses sit suspended right over the opening of each reflector cup. Transparent polycarbonate, glass or other light transparent material can also be used for this lens design.

The optics model used to provide a complete light distribution pattern on a roadway or other surface allow for lights to turn on optics modules in order to raise or lower light levels on the roadway without affecting the light distribution on the roadway.

Single sided lens features are designed with spherical contours which also use an incremental orientation adjustment over the array, which causes a randomization of lens elements in order to produce better uniformity and specifically avoids unwanted features such as bands and shadowing.

For example, the representation below is representative of an optics module containing twelve lens elements integrated into an acrylic cover lens. There are three distinct 'types' of lenses in this array:

- Lenses 1 (1101) and 2 (1102) help to both provide light throwing power and to spread light into areas that are not covered by the other lens types.
- Lenses 3 (1103), 4 (1104) and 5 (1105) provide illumination in the area directly in front of the fixture.
- Lenses 6 (1106) thru 12 (1112) provide the main throw of the distribution.

Each lens of a type of lens, have a generally similar geometry however they may be modified slightly to accommodate the required position and orientation within the lens cover.

Lens elements are designed with a curvature that bends light in directions that produces light distribution patters such as IESNA Type II, IES Type III, etc. Therefore, the optics model and lens shapes can be adjusted to produce any desired distribution without affecting the curvature which controls the distribution features which allow for superior pole spacing.

Figure 12:
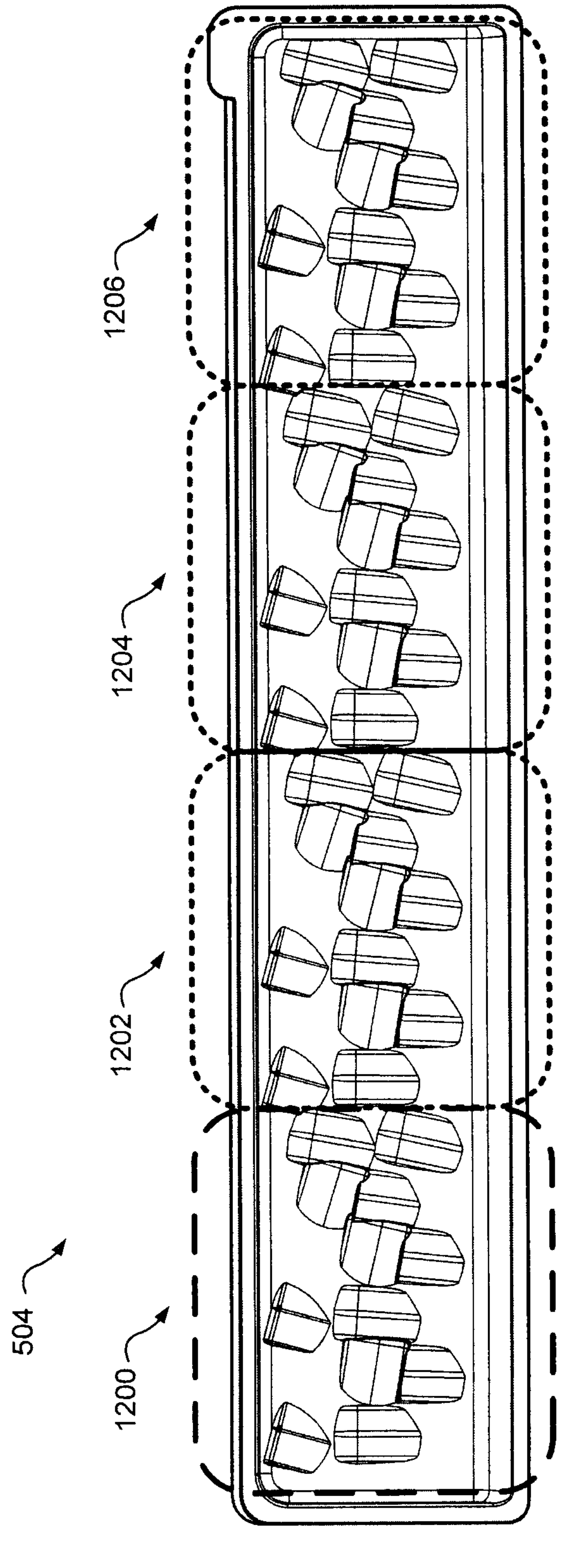
FIG. 12 shows a lens cover and the lens configurations.

FIG. 12 shows a lens cover 504 and the lens configurations. The pattern of lenses 12 lenses 1200 can be repeated in a pattern along the length of the cover. For example, a four block configuration 1200, 1202, 1204 and 1206 provide the same light pattern distribution enabling light variable light output by enabling or disabling blocks of lights. This modularity in design corresponds to blocks of repeating lens patterns in the lens cover as shown in FIG. 12. This allows the LED light fixture to be turned up or down in intensity in order to replace standard street lights of various light output and different input wattages. The inside of the lens cover can be substantially flat or may provide lens surface for interfacing with the reflector.

Figure 13A:
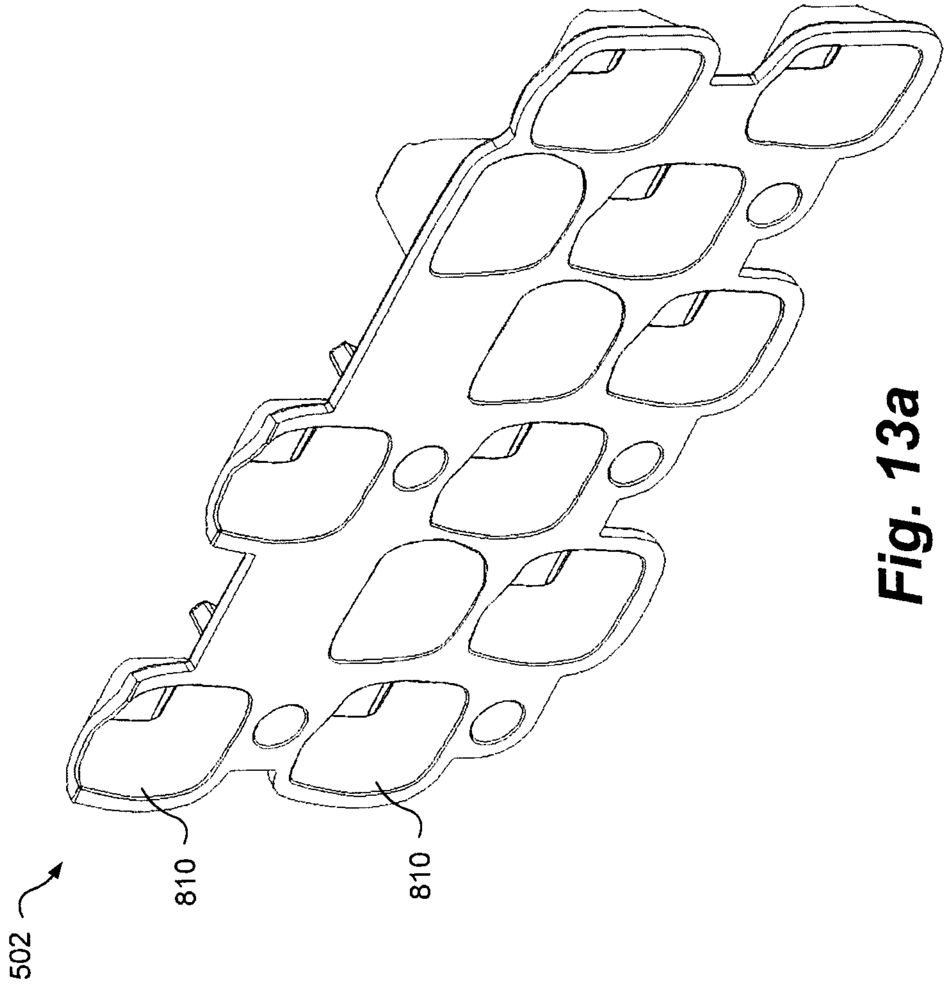
FIG. 13A-C show views of a reflector.
Figure 13B:
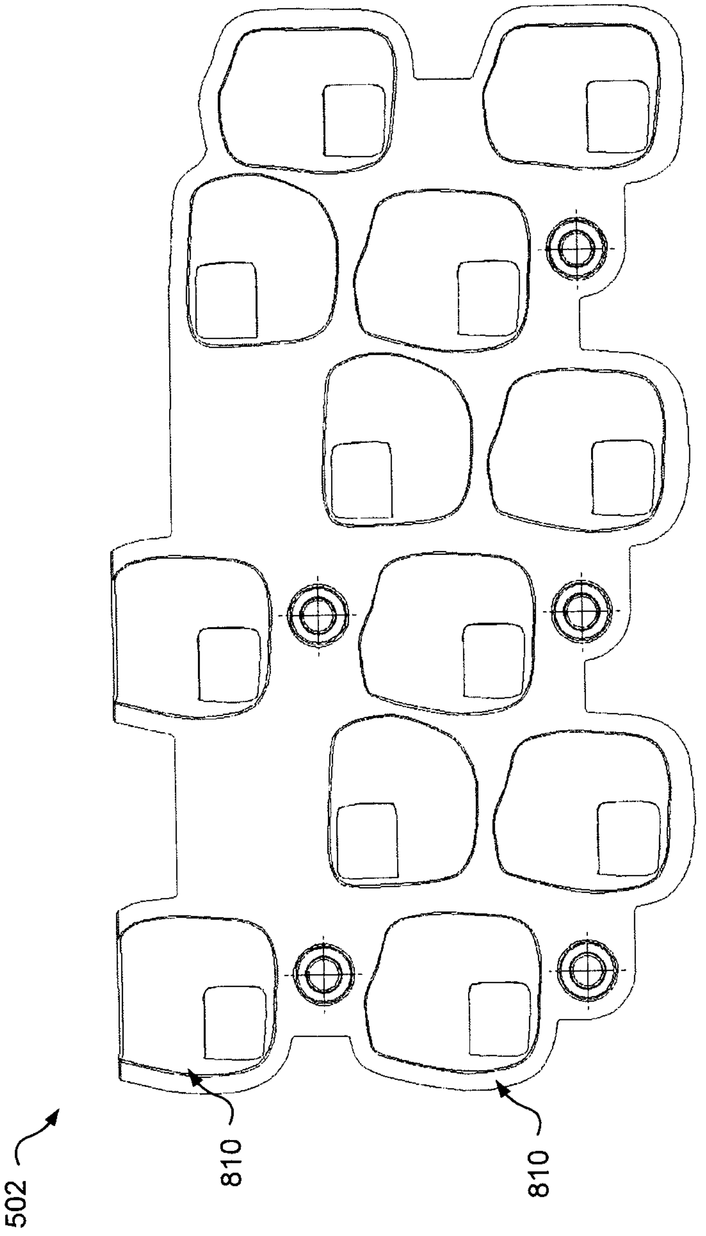
Figure 13C:
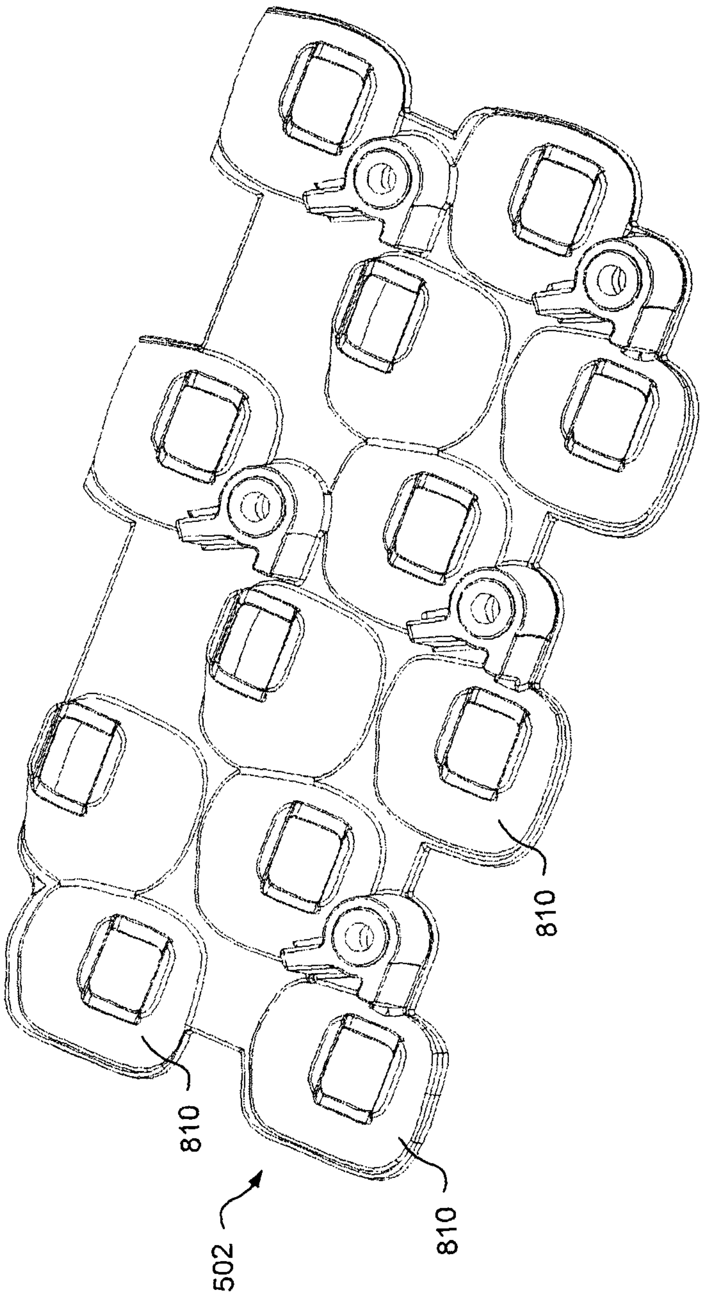

FIGS. 13A-C show views of a reflector. FIG. 13A shows a top perspective view of a reflector 502. The reflector module provides twelve reflector cups 810, although other numbers and configuration are available. FIG. 13B show a top view of the reflector 502. FIG. 13C, shows a bottom view of reflector 502 covers the LED's with individual reflector cups 810. Each reflector module utilizes multiple unique reflector elements to direct light to specific portions of the roadway to achieve a uniform illumination distribution based on IESNA and CIE standards. The reflector around each LED can all be the same, or they can be different and unique for each LED in the array. They can also be rotated from LED to LED or can be custom per LED in a module.

The reflectors are made of a dimensionally stable plastic or other moldable material to allow for maximum temperature operation and to minimize misalignment due to differing coefficients of linear expansion between the reflector and the LED engine. The material has dimensional stability, has a low coefficient of thermal expansion, and has a very wide temperature of operation and it meets all the requirements for stability and temperature that we needed in our LED light.

The reflectors are base coated, vacuum metalized (aluminum or other metal coating or coatings that offer the highest optical reflection with minimal losses) and top coated with a protective plastic or organic coating to yield a surface with high reflectivity, i.e., typically above 85%.

Each reflective element surrounds and collects light from each LED. The reflector inside surface consists of optically reflective surfaces (coated with reflective aluminum coatings) based on parabolic inside wall shapes. The reflector wall design maximizes the amount of light collected and directed towards the road side of the area below the fixture and minimizes the amount of light directed at the house side, or area behind the fixture.

An example of an optics module containing twelve LED reflectors (or the module can be based on any number of LEDs from 1 to any higher value) allows for modularity and to reduce assembly time during manufacturing and LED light assembly.

Figure 14:
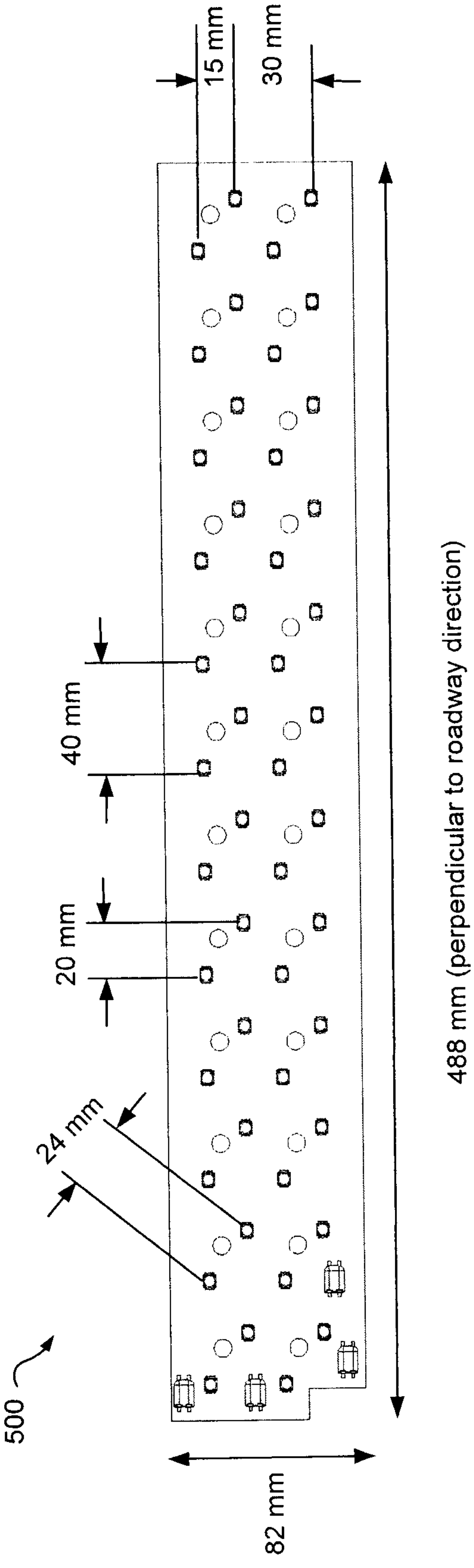
FIG. 14 shows a LED engine circuit board.

FIG. 14 shows a LED engine circuit board 500. The LED spacing is 24 mm center to center and is staggered to eliminate cross heating between LED's while keeping the board as compact as possible. On the surface of the circuit board, in the direction of the roadway the rows of LED's are spaced 15 mm apart and in the direction perpendicular to the roadway the rows of LED's are spaced 20 mm apart. With the staggered pattern the LED's spaced in the direction of the roadway are 30 mm apart in that direction from the next LED in that row. The LED's spaced in the direction perpendicular to the roadway are 40 mm apart in that direction from the next LED in that row. The circuit board is 488 mm in length by 82 mm in width. Only the required number of LEDs need to be populated to accommodate the number of optical modules required. Alternatively, individual circuit boards may be provided for each optical module if a full configuration is not required.

Copper is left in the spaces between the traces and pads to allow for more thermal mass to remove heat away from LED's. Low profile, surface mount poke-in connectors are used for ease of connection and modularity. Organic Solder Preservative (OSP) finish is used for maximum protection of copper surfaces and best solder adhesion. Boards have stepped mounting holes to serve as locator holes for the optics as well as mounting holes. Pad sizes are optimized for highest level of placement accuracy.

Zener diodes are paralleled with each LED to provide burnout protection and allow the string to keep operating if an LED should burn out. The Zener voltage is 6.2V so that the Zener does not prematurely turn on from the normal voltage required by the LED's, but low enough to have minimal effect on the voltage of the string if an LED burns out. The Zener is 3 W to be able to handle the power of either 1 W or 2 W LED's and use the power mite package which provides a small foot print and lowest profile. However, we do not see this applied in our competitor's lights. It adds a level of bypass for the current should an LED fail and is a feature that adds performance reliability to the LED light fixture.

Figure 15:
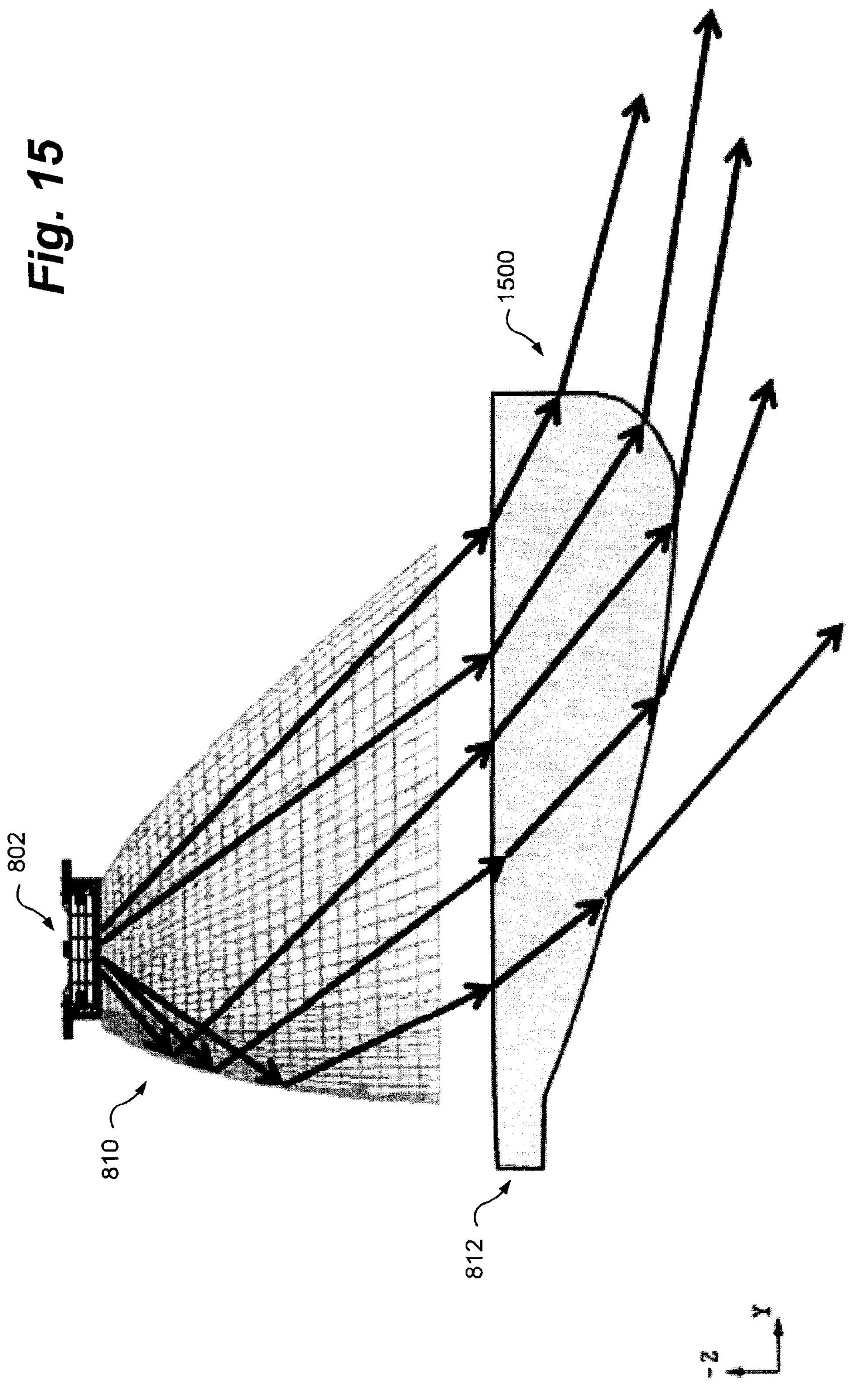
FIG. 15 shows a lighting distribution from and LED by a reflector through a refractor.

FIG. 15 shows a lighting distribution from and LED 802 by a reflector 810 through a refractor lens 812. The lens enables the light output 1500 to be directed towards a desired illumination location. Each lens profile provides different light output to cover the desired illumination surface.

Figure 16A:
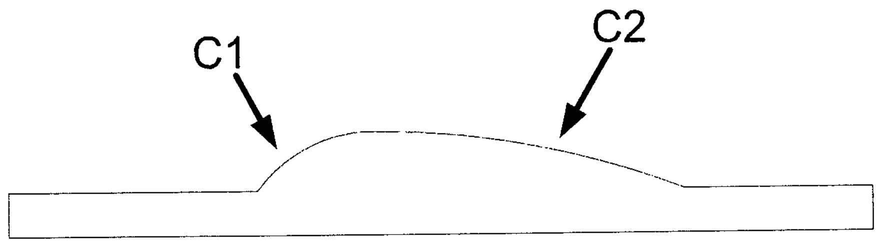
FIG. 16A shows a curvature of a lens element in the longitudinal plane (C1 & C2)
Figure 16B:
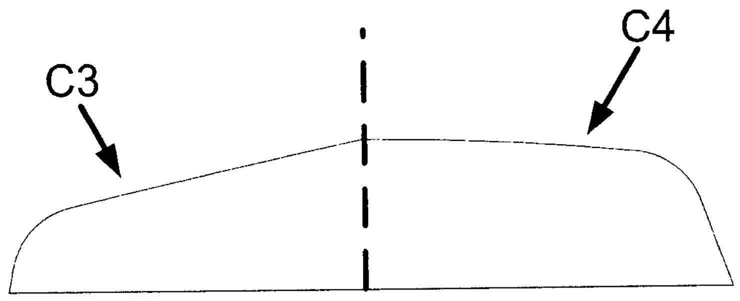
FIG. 16B shows a curvature of a lens element in the traverse plane (C3 & C4)

As shown in FIG. 16*a*, a curvature of a lens element is defined in the longitudinal plane (C1 & C2). In FIG. 16*b*, a curvature of a lens element in the traverse plane (C3 & C4) is shown. There are four main curvatures which can be manipulated in order to control or adjust the performance of the optical output, 2 in the Longitudinal Plane (C1 & C2) and 2 in the Transverse Plane (C3 & C4). A shown in FIG. 16*a*, C1 curvature controls the spread of the light main throwing direction and C2 curvature controls the amount of throw generated by the optical element. As shown in FIG. 16*b*, C3 curvature controls the width of the street side portion of the distribution. Adjusting this curvature directly changes the IESNA distribution Type produced by the fixture. C4 curvature allows for the control of undesirable back light, or light directed at the house side area below and behind the fixture.

There are three basic lens elements in the set of twelve. In each, the curvature (C1 thru C4) is defined differently as depicted in the FIGS. 17-22. The refractive elements are oriented to generate the desired pattern. The orientation variations are repeated to align with the reflector modules to maintain modularity of the optics.

Figure 17:
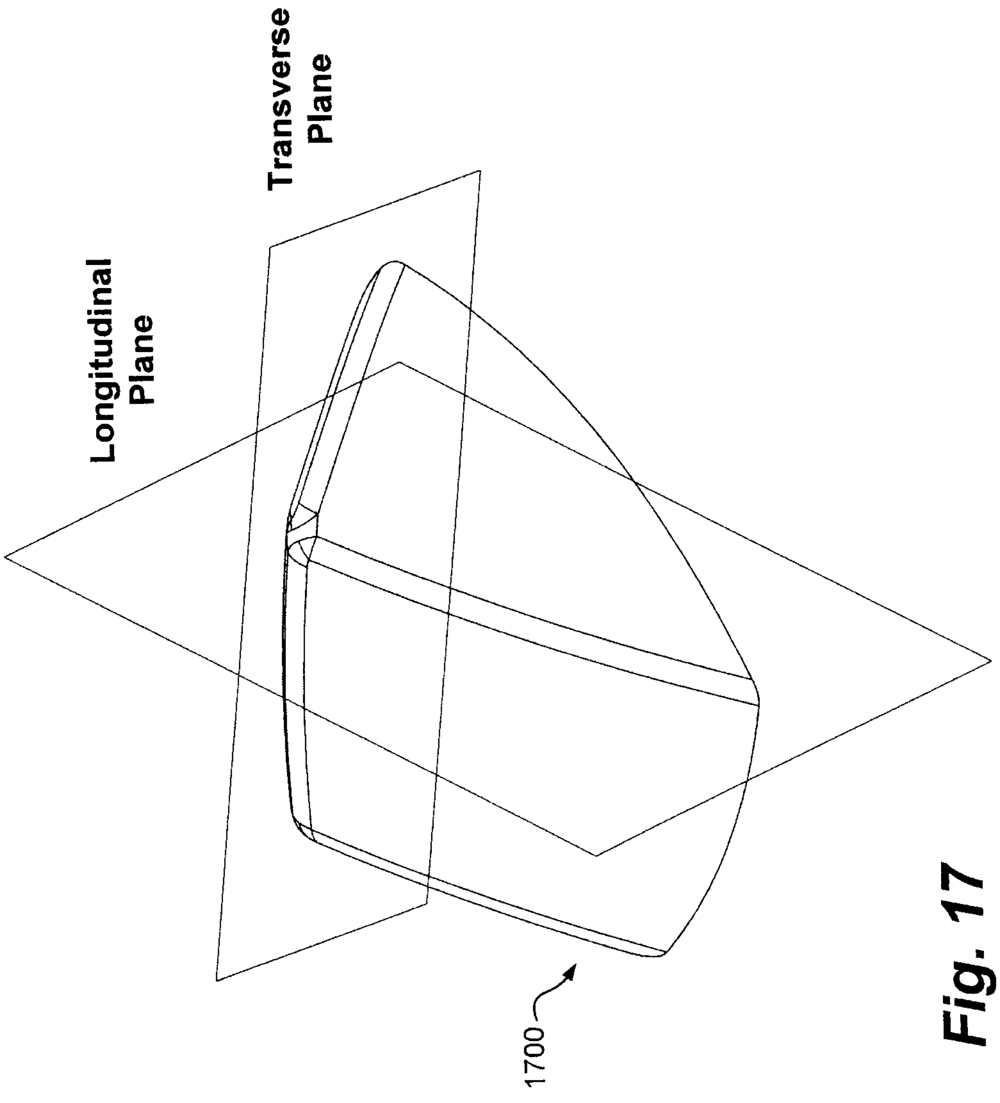
FIG. 17 shows a perspective view of lenses 1 and 2.
Figure 18A:
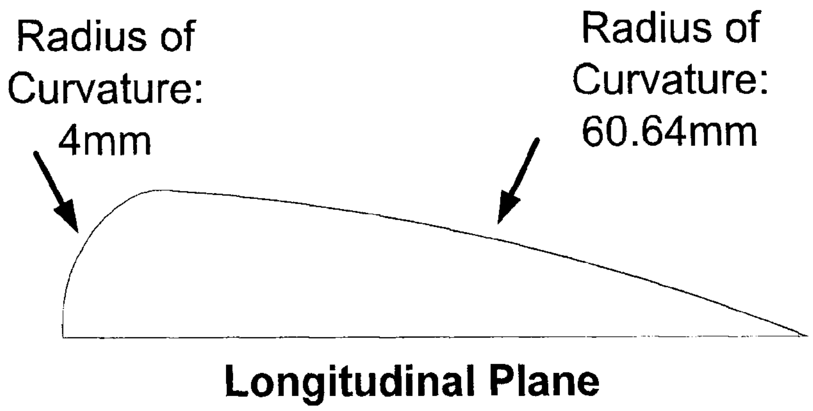
FIG. 18*a* shows a curvature of lenses 1 and 2 in the longitudinal plane.
Figure 18B:
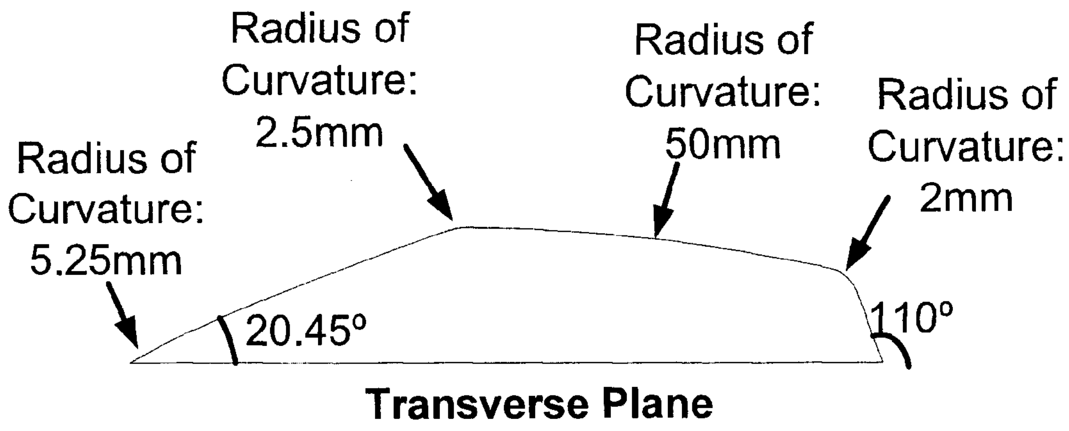
FIG. 18*b* shows a curvature of lenses 1 and 2 in the traverse plane.

Lenses 1 & 2 (1101, 1102), as shown in FIG. 17, is divided by a longitudinal and transverse planes as shown in FIGS. 18A and 18B respectively. In the longitudinal plane the lens 1700 has a curvature of approximately 4 mm radius at the front section and a 60 mm radius in the tailing section. In the transverse plane, the lens has a curvature of approximately 5.25 mm radius at an angle of approximately 20°, 2.5 mm radius and 50 mm radius at the mid-section and 1 mm radius at an angle of approximately 110° external angle.

Figure 19:
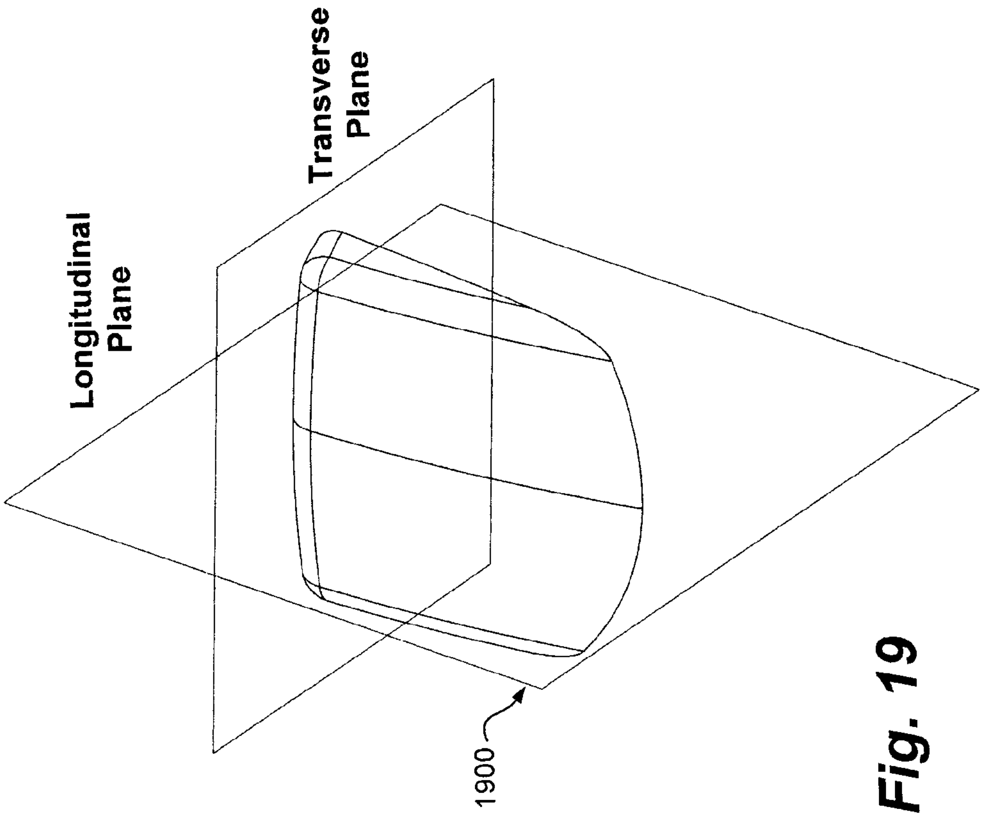
FIG. 19 shows a perspective view of lenses 3 thru 5.
Figure 20A:
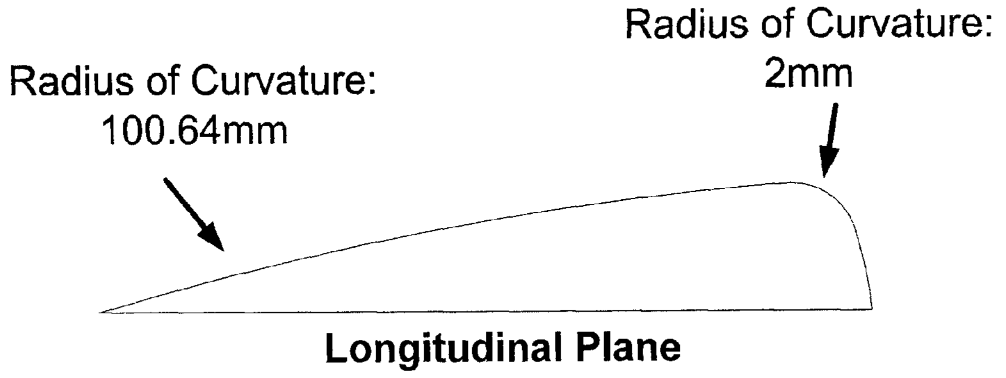
FIG. 20A shows a curvature of lenses 3 through 5 in the longitudinal plane.
Figure 20B:
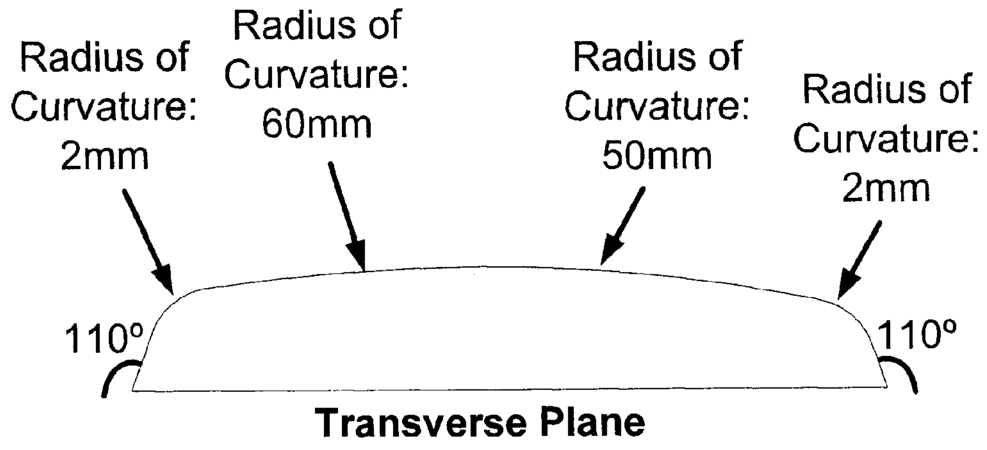
FIG. 20B shows a curvature of lenses 3 through 5 in the traverse plane.

Lenses 3 thru 5 (1103-1105), as shown in FIG. 19, is divided by a longitudinal and transverse planes as shown in FIGS. 20A and 20B respectively. In the longitudinal plane the lens 1900 has a curvature of approximately 2 mm radius in a front section and 100 mm radius in the tailing section. In the transverse plane, the lens has a curvature of approximately 2 mm and 50 mm, 60 mm and 2 mm in radius.

Figure 21:
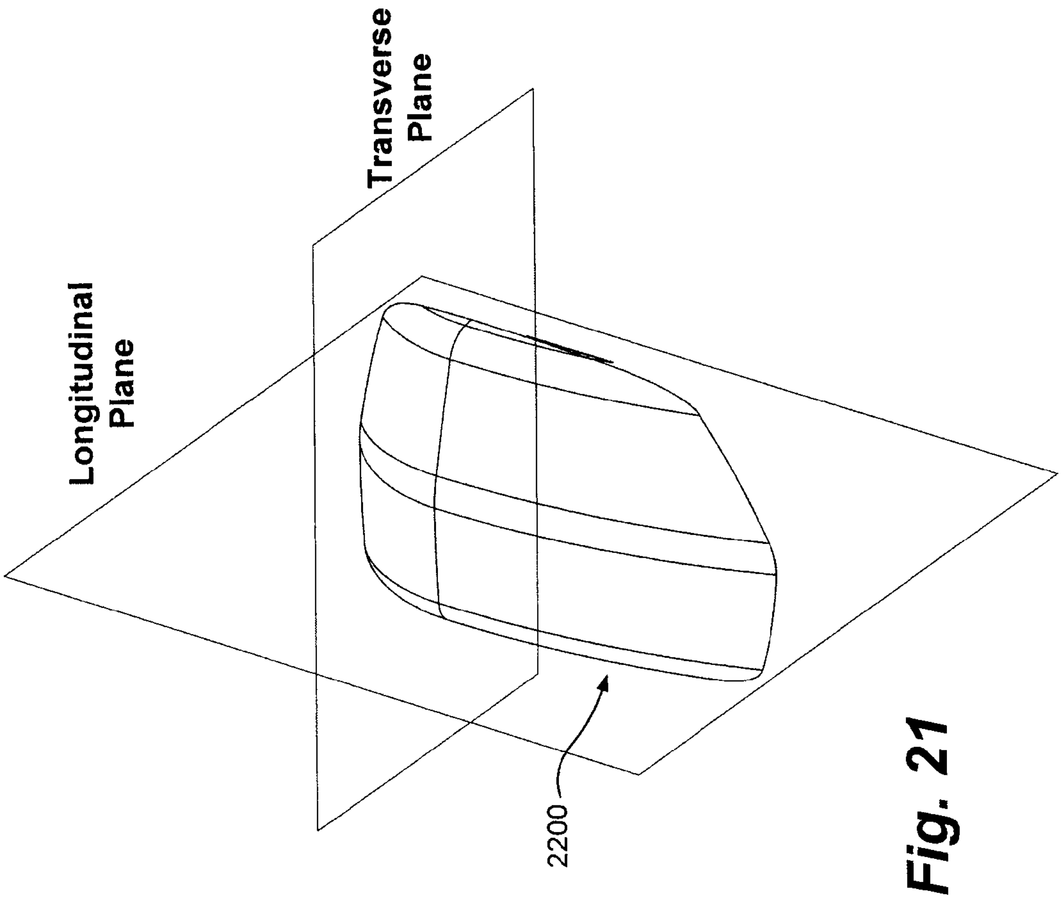
FIG. 21 shows a perspective view of lenses 6 thru 12.
Figure 22A:
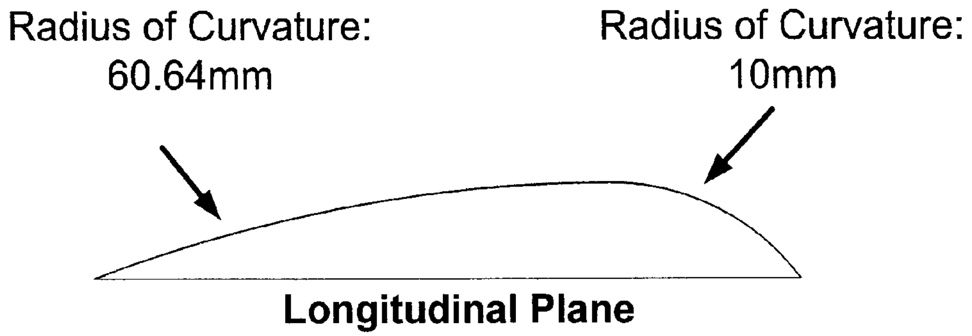
FIG. 22A shows a curvature of lenses 6 through 12 in the longitudinal plane.
Figure 22B:
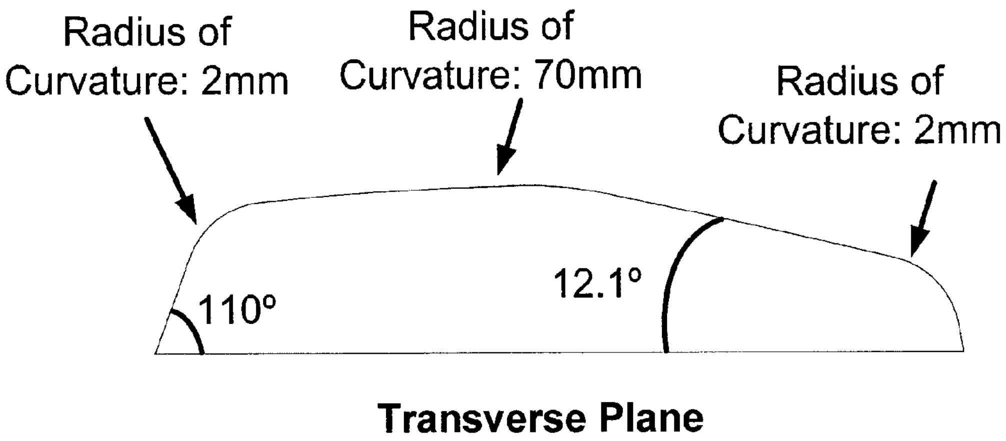
FIG. 22B shows a curvature of lenses 6 through 12 in the traverse plane.

Lenses 6 thru 12 (1106-1112), as shown in FIG. 21, is divided by a longitudinal and transverse planes as shown in FIGS. 22A and 22B respectively. In the longitudinal plane the lens has a curvature of approximately 10 mm and 60 mm in radius. In the transverse plane, the lens 2100 has a curvature in the transverse direction of approximately 2 mm radius with an internal angle of approximately 110° at a front section, and 70 mm radius at a mid-section and a 2 mm radius at a tailing section with an internal angle of approximately 12°. As can be seen in the drawings some of the profiles of the lens have been modified to fit within the lens array. For example, lenses 9, 10, and 11 have a truncated C1 profile to accommodate positioning within the array.

Acceptable dimensions of the single elements in the groups of lenses that make up the 12 lens array, are given below in Length×Width×Height Elements 1-2: 20.7 mm×21.6 mm×3.85 mm Elements 3-5: 29.6 mm×19.4 mm×3.95 mm Elements 6-12: 23.1 mm×23.0 mm×3.72 mm The Length and Width dimensions are driven by the height of the elements and the curvature of each element as was previously defined. The dimensions may be varied, however a slight variation approximately +/−0.2 mm to the curvature of the elements is acceptable based upon overall design requirements. The dimensions of the lens can be adjusted based upon the dimensions of the reflector cups. Although a 12 lens configuration has been disclosed it should be understood any configuration comprising a multiple of LED's could be utilized.

Figure 23B:
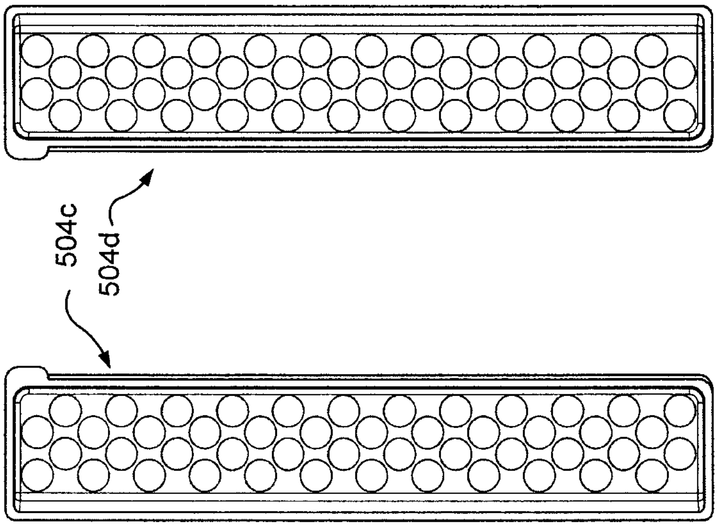
FIG. 23A-23D shows views of an alternate lens cover configuration.
Figure 23A:
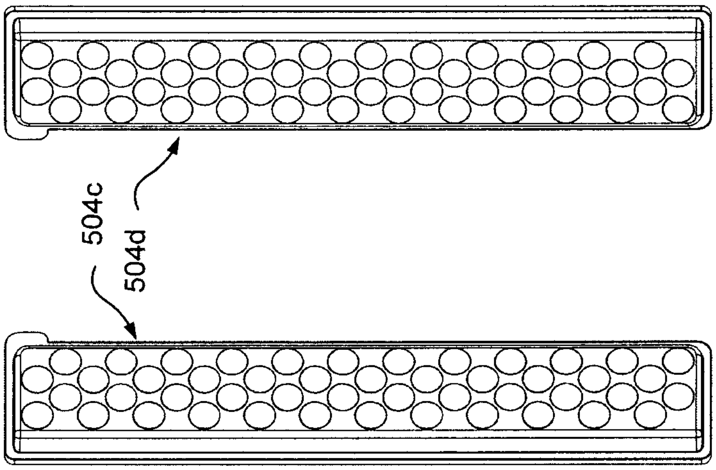
Figure 23D:
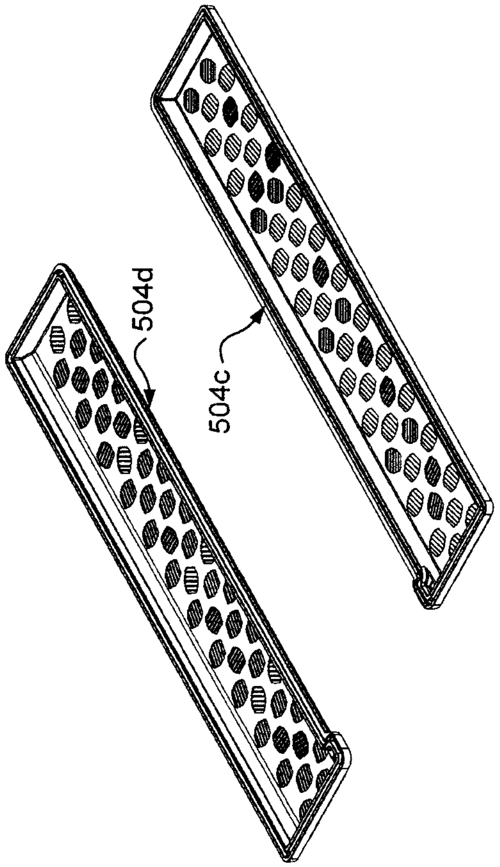
Figure 23C:
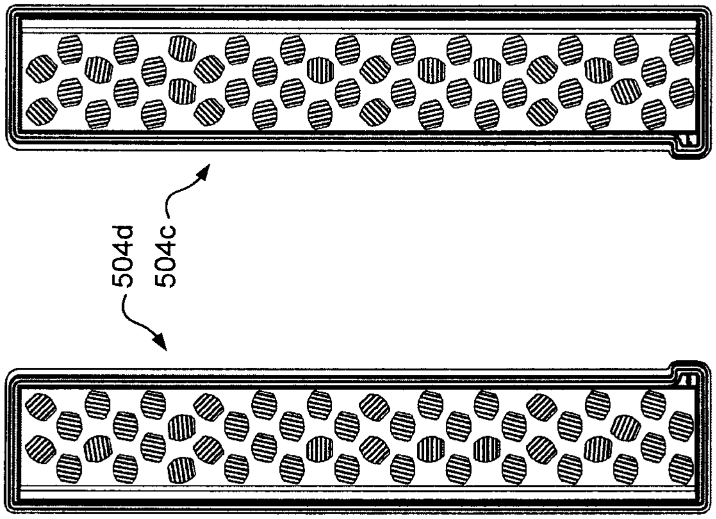

FIG. 23A-D shows views of an alternate lens cover of a illumination section. The lens cover comprises a lens for each of the associated LED and reflector cups. The lens covers are provided in pairs, 504*c*, 504*d* providing symmetrical lighting patterns. FIG. 23A shows the lens covers 504*c*, 504*d* from below, at an angle of 30° from the illumination plane. FIG. 23B shows the lens covers 504*c*, 504*d* in a flat configuration. FIG. 23C shows the lens covers 504*c*, 504*d* from behind and FIG. 23D shows a perspective view of the lens. The molded lens cover is designed with an optically modeled collection of flat or curved facets intended to generate a variety of different optical street patterns, i.e., such as IES Type I, Type II, Type III, Type VI and Type V.

The lenses are molded into the large lens cover so that the individual refractor lenses sit right over the opening of each reflector cup. Transparent polycarbonate or glass can also be used for this lens design. The refractive elements consist of a combination of custom Fresnel surfaces towards the LED, and a top lens which, in combination with the reflector, generates the desired illumination pattern, i.e., Type I, Type II etc. The refractive elements are oriented to generate the desired pattern. The orientation variations are repeated to align with the reflector modules to maintain modularity of the optics.

It will be apparent to one skilled in the art that numerous modifications and departures from the specific embodiments described herein may be made without departing from the spirit and scope of the present disclosure.

The invention claimed is:

1. An optical module for use in a lighting fixture for providing illumination of a plane, the optical module comprising:

a plurality of light emitting diodes (LEDs) mounted on a circuit board;

a plurality of reflector cups, each reflector cup surrounding one of the plurality of LEDs at a narrow first end and a larger opening at a second end opposite the LED; and a lens cover comprising a plurality of molded lenses, each for covering one of the plurality of reflector cups, each of the plurality of molded lenses of the lens cover positioned at the second end of the reflector cups providing a refractor over the opening of each reflector, wherein each of the plurality of molded lenses are oriented to provide illumination towards a plane in a defined lighting pattern, the lens cover comprising two or more blocks of repeating lens patterns, each block comprising at least a first lens and a second lens having a configuration profile different from the first lens, each repeating lens pattern of the two or more blocks providing the same light distribution pattern, wherein each lens comprising one of four curvature configurations, two on the longitudinal plane and two on the transverse plane of the lens, the first lens having a profile comprising curvatures in a longitudinal direction of approximately 10 mm and approximately 60 mm in radius and having curvatures in a transverse direction of approximately 2 mm radius with an internal angle of approximately 110° at a front section, and approximately 70 mm radius at a mid-section and a approximately 2 mm radius at a tailing section with an internal angle of approximately 12°.

2. The optical module of claim 1 wherein the reflector cups are arranged so that the LEDs are staggered, or the lenses are molded on an exterior of the lens cover towards the illumination plane.

3. The optical module of claim 2 wherein the molded lens configuration is configured to illuminate the plane when the optical module is oriented at 30 degrees towards a center line of the light fixture relative to the illumination plane, the light fixture having at least two opposing optical modules distally spaced on either side of a center section in a canopy of a light fixture, each of the opposing optical modules illuminating opposite side of the plane.

4. The optical module of claim 1 wherein repeating block comprises twelve lenses each associated with one of the plurality of LEDs.

5. The optical module of claim 1 where each lens cover comprises four repeating blocks of lenses.

6. The optical module of claim 1 wherein the dimensions of the first lens are approximately 23.1 mm×23.0 mm×3.72 mm (Length×Width×Height).

7. The optical module of claim 1 wherein the second lens has a profile comprising curvatures in a longitudinal direction of approximately 2 mm radius in a front section and 100 mm radius in the tailing section; and having curvatures in a transverse direction of approximately 2 mm and 50 mm, 60 mm and 2 mm in radius.

8. The optical module of claim 7 wherein the dimensions of the second lens are approximately 29.6 mm×19.4 mm×3.95 mm (Length×Width×Height).

9. The optical module of claim 1 wherein the second lens has a profile comprising curvatures in a longitudinal direction of approximately 4 mm radius at the front section and a 60 mm radius in the tailing section and having curvatures in a transverse direction of approximately 5.25 mm radius at an angle of approximately 20°, 2.5 mm radius and 50 mm radius at the mid-section and 1 mm radius at an angle of approximately 110° external angle.

10. The optical module of claim 9 wherein the dimensions of the second lens are approximately 20.7 mm×21.6 mm×3.85 mm (Length×Width×Height).

11. The optical module of claim 6 wherein the dimensions are +/−0.2 mm.

12. The optical module of claim 1 wherein the molded lens has flat or curved facets.

13. The optical module of claim 2 wherein the fixture interfaces with a cobra head mount.

14. The optical module of claim 1 wherein a IES Type II illumination pattern is provided.

15. The optical module of claim 1 wherein the refractor lens is spherical non-symmetric refractor lens.

16. The optical module of claim 1 wherein the reflector cups has a shape comprising parabolas, ellipses, compound parabolic concentrators and compound elliptical reflectors.

17. The optical module of claim 1 wherein the reflector cups has in an inside surface comprising optically reflective surface.

18. The optical module of claim 17 wherein the reflectors are made of a dimensionally stable plastic.

19. The optical module of claim 18 wherein the reflector is base coated with a vacuum metalized aluminum coating and a top coating of a protective plastic or organic coating to yield a surface with 85% or more reflectivity.

20. The optical module of claim 1 wherein refractor lens cover is made of acrylic, transparent polycarbonate or glass.

21. The optical module of claim 1 wherein the outer surface of the first lens comprises first and second curvatures in a longitudinal direction of the first lens and third and fourth curvatures in the transverse direction of the first lens, the radius of the first curvature being different from the radius of the second curvature, the radius of the third curvature being different from the radius of the forth curvature.

22. The optical module of claim 21 wherein the first lens comprises a fifth curvature in the traverse direction.

23. The optical module of claim 21 wherein the outer surface of the first lens comprise a top portion, a first side portion extended at a first angle toward the top portion and a second side portion extended at a second angle toward the top portion, the first angle being different from the second angle.

* * * * *